US009992350B2

(12) United States Patent
Gundamaraju et al.

(10) Patent No.: US 9,992,350 B2
(45) Date of Patent: Jun. 5, 2018

(54) ENHANCED REDIRECTION HANDLING FROM POLICY SERVER

(71) Applicant: Affirmed Networks, Inc., Acton, MA (US)

(72) Inventors: Krishna Gundamaraju, Westborough, MA (US); Srinivas Kappla, Nashua, NH (US); Surya Vemuri, Columbia, MD (US)

(73) Assignee: AFFIRMED NETWORKS, INC., Acton, MA (US)

( * ) Notice: Subject to any disclaimer, the term of this patent is extended or adjusted under 35 U.S.C. 154(b) by 138 days.

(21) Appl. No.: 15/066,472

(22) Filed: Mar. 10, 2016

(65) Prior Publication Data

US 2016/0269566 A1    Sep. 15, 2016

Related U.S. Application Data

(60) Provisional application No. 62/130,871, filed on Mar. 10, 2015.

(51) Int. Cl.
*H04L 12/14* (2006.01)
*H04L 12/66* (2006.01)
(Continued)

(52) U.S. Cl.
CPC ........ *H04M 15/66* (2013.01); *H04L 12/1407* (2013.01); *H04L 12/1417* (2013.01);
(Continued)

(58) Field of Classification Search
CPC ............. H04L 12/1407; H04L 12/1417; H04L 12/1467; H04L 12/66; H04W 4/24
See application file for complete search history.

(56) References Cited

U.S. PATENT DOCUMENTS 9,300,623 B1    3/2016 Earl et al.
2004/0131023 A1   7/2004 Auterinen
(Continued)

FOREIGN PATENT DOCUMENTS

CN    101093590 A    12/2007
CN    102390184 A    3/2012
(Continued)

OTHER PUBLICATIONS

International Search Report and Written Opinion issued by the U.S. Patent and Trademark Office as International Searching Authority for International Patent Application No. PCT/US16/21744 dated Jun. 9, 2016 (8 pgs.).

(Continued)

*Primary Examiner* — Ronald B Abelson
(74) *Attorney, Agent, or Firm* — Wilmer Cutler Pickering Hale and Dorr LLP

(57) ABSTRACT

Systems and methods are disclosed for directing a mobile device user with insufficient mobile credit to secondary pay sites. A PCRF receives a request from a mobile device corresponding to a user. The PCRF detects credit associated with a user mobile network usage account is below a threshold and assigns a tag to the request, the tag including redirect site information and secondary site information, the redirect site information including at least one network identifier corresponding to a redirect site and the secondary site information including at least one network identifier corresponding to a payment site accessible by the user when the credit associated with the user mobile network usage account is below the threshold. The PCRF transmits the request and the corresponding tag to a PCEF for routing the user to the at least one of the redirect site and the at least one payment site.

20 Claims, 6 Drawing Sheets

(51) Int. Cl.
  *H04W 4/24* (2018.01)
  *H04M 15/00* (2006.01)
  *H04M 17/02* (2006.01)
(52) U.S. Cl.
  CPC .......... *H04L 12/1467* (2013.01); *H04L 12/66* (2013.01); *H04M 15/8044* (2013.01); *H04M 15/85* (2013.01); *H04M 15/852* (2013.01); *H04M 15/88* (2013.01); *H04M 15/882* (2013.01); *H04M 17/02* (2013.01); *H04W 4/24* (2013.01); *H04M 15/881* (2013.01)

(56) References Cited

U.S. PATENT DOCUMENTS

| | | |
|---|---|---|
| 2005/0136832 A1 | 6/2005 | Spreizer |
| 2006/0008063 A1 | 1/2006 | Harnesk et al. |
| 2006/0168655 A1 | 7/2006 | Grandmaitre et al. |
| 2008/0240082 A1 | 10/2008 | Feldman et al. |
| 2009/0109845 A1 | 4/2009 | Andreasen et al. |
| 2010/0128708 A1 | 5/2010 | Liu et al. |
| 2010/0281151 A1 | 11/2010 | Ramankutty et al. |
| 2012/0190331 A1 | 7/2012 | Ahmed et al. |
| 2013/0231080 A1 | 9/2013 | Cheuk et al. |
| 2014/0098671 A1 | 4/2014 | Raleigh et al. |
| 2014/0359041 A1 | 12/2014 | Bai |
| 2016/0028607 A1 | 1/2016 | Weill et al. |
| 2016/0270142 A1 | 9/2016 | Olsson et al. |

FOREIGN PATENT DOCUMENTS

| | | |
|---|---|---|
| CN | 102555536 A | 7/2012 |
| CN | 202965525 U | 6/2013 |
| CN | 203311505 U | 11/2013 |
| EP | 1011974 A1 | 6/2000 |
| GB | 2409368 A | 6/2005 |

OTHER PUBLICATIONS

3GPP, "Universal Mobile Telecommunications System (UMTS); UTRAN Overall Description (3GPP TS 25.401 version 12.0.0 Release 12)", ETSI TS 125 401 V12.0.0 (Oct. 2014); European Telecommunications Standards Institute, Oct. 2014, pp. 1-64 (65 pages—entire document).

Extended European Search Report issued by the European Patent Office for European Patent Application No. 12825827.4 dated Mar. 6, 2015 (7 pages).

Horak, R., Excerpt from "Internet Protocols", in Telecommunications and Data Communications Handbook, John Wiley & Sons, p. 663-664, Aug. 2007 (2 pages).

International Search Report and Written Opinion issued by the U.S. Patent and Trademark Office as International Searching Authority for International Application No. PCT/US12/21520 dated May 8, 2012 (8 pages).

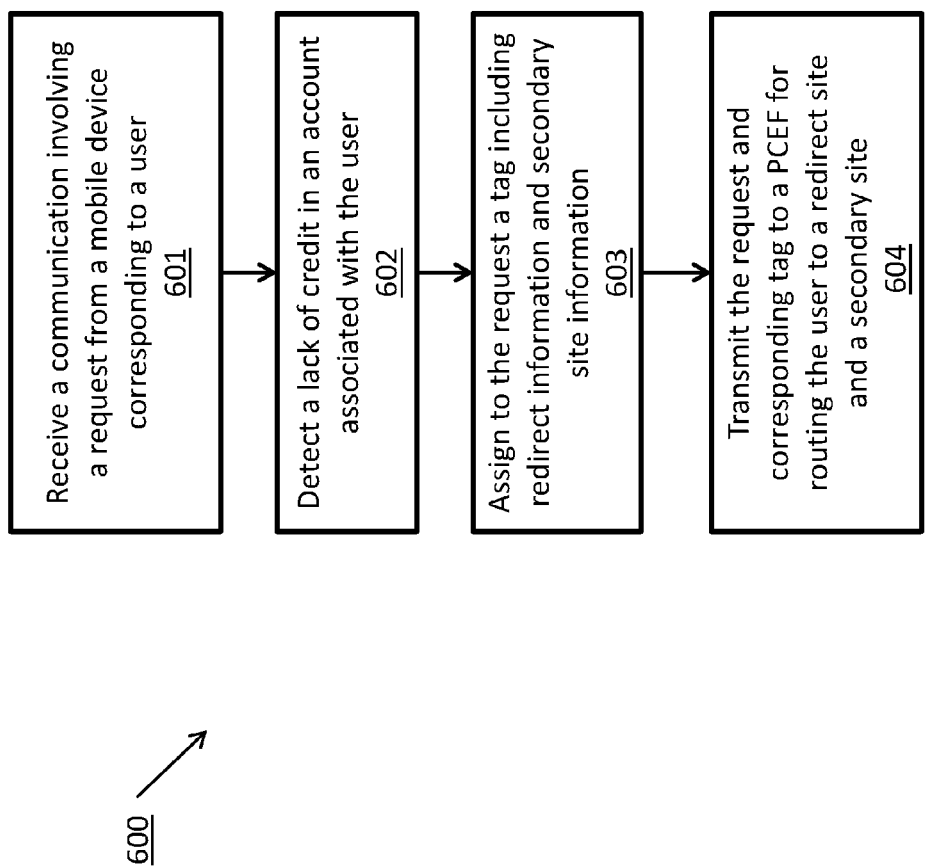

ENHANCED REDIRECTION HANDLING FROM POLICY SERVER

CROSS REFERENCE TO RELATED APPLICATIONS

This application claims priority under 35 U.S.C. 119(e) to U.S. Provisional Application No. 62/130,871, filed Mar. 10, 2015, entitled "Enhanced Redirection Handling from Policy Server," the contents of which is incorporated herein in its entirety.

TECHNICAL FIELD

Embodiments of the invention generally relate to computerized methods and apparatuses for redirection handling in a telecommunications network.

BACKGROUND

Traditionally, Redirect-Information Attribute-Value Pairs (AVPs) have been used to redirect users who have exceeded their allotted quota in a mobile network data plan. The Redirect-Information AVP only identifies the Internet Protocol (IP) address or the Uniform Resource Locator (URL) of the redirect server. Any other URLs or IP addresses that the user needs to visit in order to purchase additional quota is currently not communicated in this AVP. In order to allow the user to visit the secondary sites, the operator typically configures some static rules on a Policy and Charging Enforcement Function (PCEF) in order to free rate the traffic that is destined to (or originating from) these secondary sites. This forces the operator to always manage and maintain this static configuration on the PCEF. This can become cumbersome as the operator would have to configure these static rules on each PCEF whenever the operator signs up contracts with other resellers (as each of the resellers would have their own redirect URLs and secondary sites).

SUMMARY OF THE INVENTION

Systems and methods are disclosed herein for directing a mobile device user with insufficient mobile credit to secondary pay sites. In some embodiments, the systems and methods include receiving, by a Policy Control and Charging Rules Function (PCRF), a request from a mobile device corresponding to a user, the request including a URL. In some embodiments, the systems and methods include detecting, by the PCRF, a credit associated with a user mobile network usage account is below a threshold. In some embodiments, the systems and methods include assigning, by the PCRF, a tag to the request, the tag including redirect site information and secondary site information, the redirect site information including at least one network identifier corresponding to a redirect site and the secondary site information including at least one network identifier corresponding to a payment site accessible by the user when the credit associated with the user mobile network usage account is below the threshold. In some embodiments, the systems and methods include transmitting, by the PCRF, the request and the corresponding tag to a Policy and Charging Enforcement Function (PCEF) for routing the user to the at least one of the redirect site and the at least one payment site.

In some embodiments, the tag further includes at least one of a restriction filter rule, the restriction filter rule associated with at least one payment site such that traffic associated with the payment site is not blocked. In some embodiments, the restriction filter rule is associated with a restriction filter ID, the restriction filter ID associated with a restriction filter rule preconfigured on the PCEF. In some embodiments, the request further includes a credit control request update (CCR-U) message, the CCR-U message including usage information associated with the user. In some embodiments, the CCR-U message further includes at least one of information about a subscription ID, the subscription ID identifying the user; and information about a used service ID, the used service ID indicating an amount of quota used since a service associated with the user became active. In some embodiments, the PCEF is co-located with a packet data network gateway (PGW). In some embodiments, the tag comprises at least one attribute-value pair (AVP). In some embodiments, the tag further includes at least one of a redirection enablement status; and a redirect address type, the redirect address type associated with at least one of an IPv4 address, IPv6 address or a URL. In some embodiments, the network identifier comprises at least one of an IP address and a URL. In some embodiments, the threshold is associated with the user having 10% or less credit remaining in the user mobile network usage account.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

FIG. 6 is a flowchart illustrating the routing of a user, by a PCRF, to a redirect site and a secondary pay site, according to some embodiments of the present disclosure.

DETAILED DESCRIPTION

This disclosure relates to systems and methods for directing customers to redirect or secondary payment sites. In some embodiments, instead of manually establishing rules in an enforcement engine for every new customer or reseller, a policy and charging rules function (PCRF), which acts as a Policy Decision Point, can dynamically provide this information to the enforcement engine.

Figure 1:
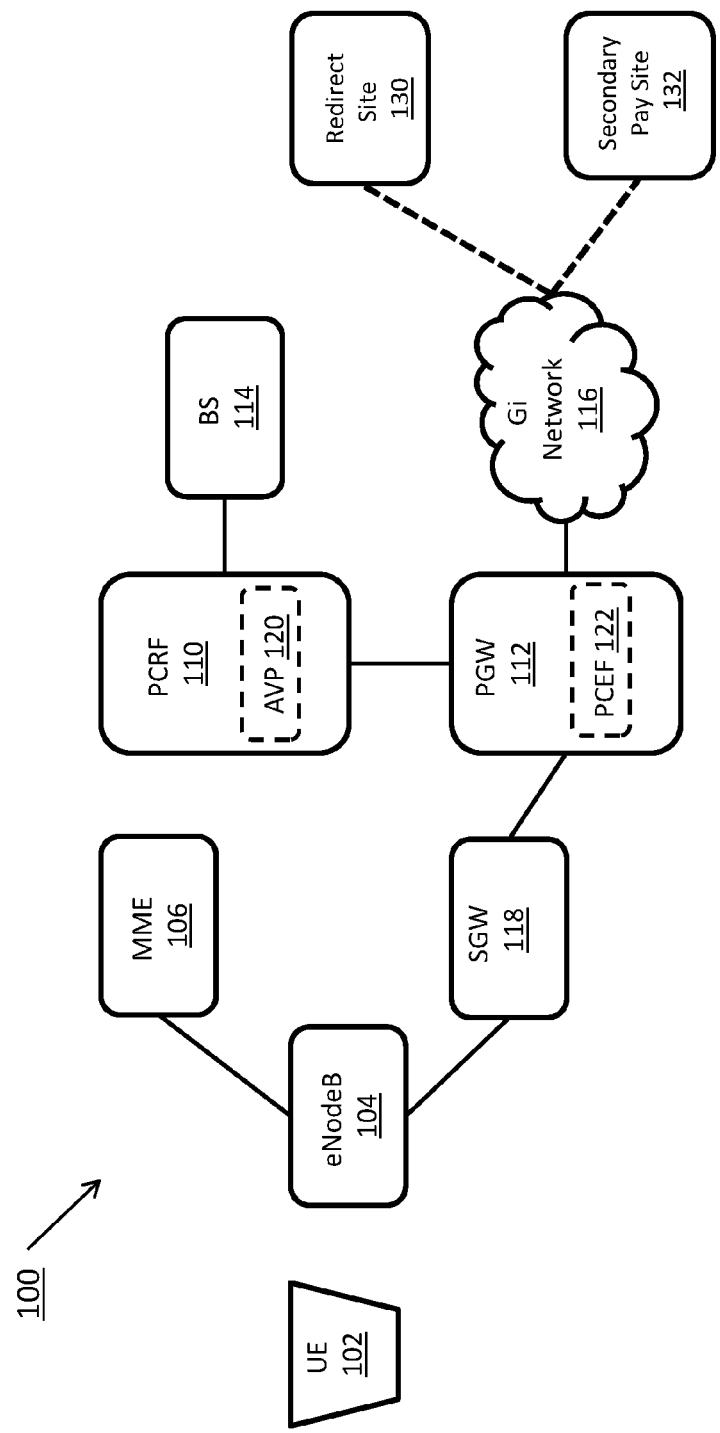
FIG. 1 is a system diagram showing a networked system, according to some embodiments of the present disclosure.

FIG. 1 is a system diagram showing a networked system 100, according to some embodiments. System 100 includes user equipment (UE) 102, evolved node B (eNodeB) 104, mobility management entity (MME) 106, serving gateway (SGW) module 108, policy and charging rules function (PCRF) 110, packet data network gateway (PGW) 112, backend billing system (BS) 114, gigabit wireless (Gi) network 116, attribute value pairs (AVP) 120, policy and charging enforcement function (PCEF) 122, redirect site 130, and secondary pay site 132.

UE 102 connects to the networked system 100 through eNodeB 104. UE 102 includes computing devices configured to connect to a mobile data network (e.g., mobile phones, tablets, laptops). eNodeB 104 is a radio part of a cell site. A single eNodeB 104 may contain several radio transmitters, receivers, control sections and power supplies. eNodeB 104 can be backhauled to MME 106 and SGW 108. Backhaul is a process of transferring packets or communication signals over relatively long distances to a separate location for processing. SGW 108 routes and forwards user data packets, while also acting as the mobility anchor for a user plane during inter-eNodeB handovers. MME 106 is a control node in the networked system 100. MME 106 handles the LTE related control plane signaling that also includes mobility and security functions for UE 102 that attaches to the LTE Radio network. MME 106 also handles UE being in idle mode, including support for Tracking area management and paging procedures.

When a UE 102 attaches to the network, multiple control messages are exchanged between network elements in order to create a data session (e.g., a 4G session) and provide data connectivity to the UE 102. As explained above, eNodeB 104 can be backhauled to MME 106 and SGW 108. SGW 108 routes and forwards user packets to PGW 112. PGW 112 can act as a Policy Enforcement Point (PEP). PGW 112 communicates with PCRF 110, which can download policy information that is specific to a subscriber. PCRF acts as a Policy Decision Point (PDP). At the time of session creation, PCRF 110 can request PGW 112 to track usage information for a specific session and inform PCRF 110 when a usage threshold is reached. Usage information can include an allotted quota corresponding to UE 102 (e.g., mobile data credit amount) and can be configured to a set amount. In some embodiments, PCRF can be connected to a backend billing system (BS) 114. As described in more detail below, BS 114 can communicate user billing information to PCRF 110.

In some embodiments, PCRF 110 includes one or more AVPs 120. As described in more detail below, PCRF 110 can use one or more AVPs to communicate information regarding redirection of a request when a usage threshold is reached. In some embodiments, PGW 112 can include PCEF 122. PCEF 122 enforces policy decisions received from PCRF 110.

PGW 112 also provides UE 102 with connections to external packet data networks through Gi Network 116. When a user exhausts his allowed quota, PCRF 110 instructs PCEF 122 to redirect the application traffic to a redirected URL 130. Upon redirection, the portal simply states that the user has reached his credit limit and that he needs to fill up (recharge) his quota by purchasing more quota. The process of purchasing new quota typically requires the user to click on an additional link that takes the user to a secure http site 132 where the user can either enter his/her credit card information or bank account information in order to pay for the transaction. Those IP addresses and the URLs that the user has to visit (also referred to herein as a network identifier) in order to recharge his quota are collectively referred to as secondary sites herein.

Figure 2B:
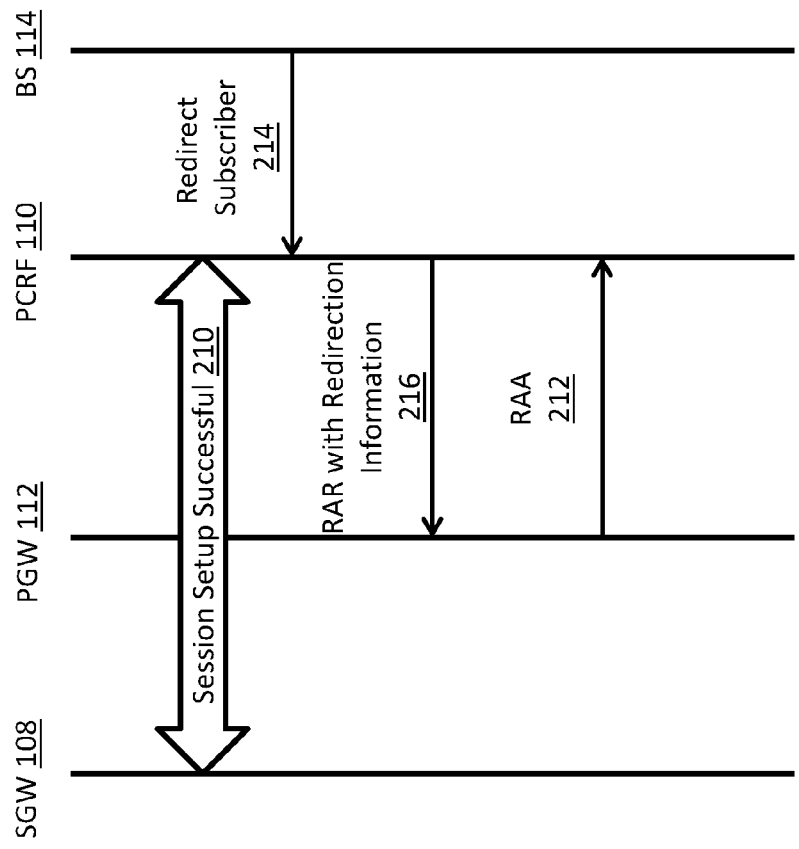
FIG. 2B is a diagram showing sending and receiving of messages between PGW, PCRF and backend billing system, according to some embodiments of the present disclosure.
Figure 2A:
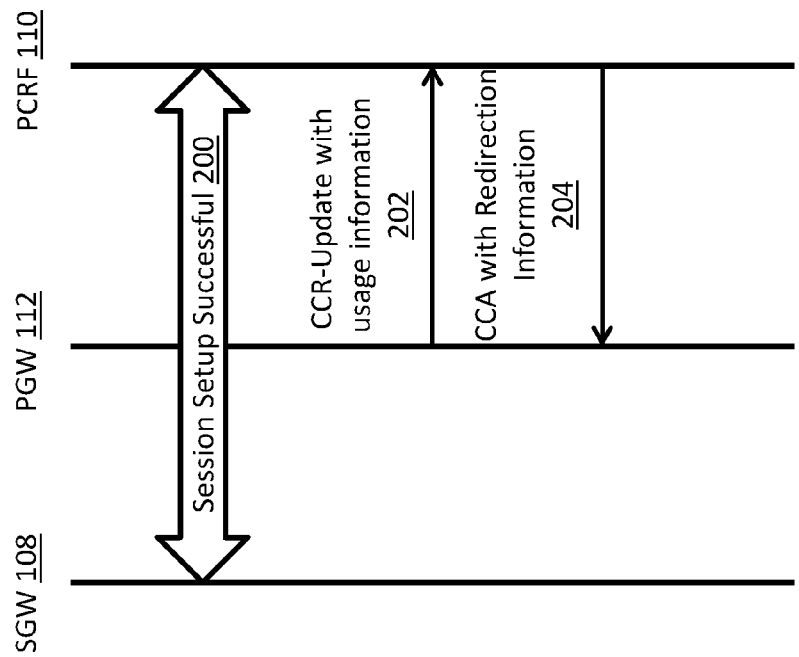
FIG. 2A is a diagram showing sending and receiving of messages between PGW and PCRF, according to some embodiments of the present disclosure.

FIG. 2A is a diagram showing sending and receiving of messages between PGW and PCRF when a usage threshold is reached, according to some embodiments of the present disclosure. FIG. 2A shows SGW 108, PGW 112, PCRF 110, session setup status 200, message sent from PGW to PCRF 202, and message sent from PCRF to PGW 204.

Session setup status 200 shows that UE 102 is able to first successfully attach to the network. As part of a network-attach procedure, PCRF 110 assigns a specific usage threshold for UE 102 and requests the PCEF 122 to contact PCRF 110 when the UE's usage reaches an assigned usage threshold. After a successful network attachment, PGW can determine when a usage threshold is reached. When a usage threshold is reached, PGW 112, which includes PCEF 122, sends a credit control request update (CCR-U) message 202 to PCRF 110 and communicates the usage information to PCRF 110. Briefly, CCR-U message includes information about the subscription-id, which identifies the subscriber, and used-service-id, which indicates the amount of quota used since the service became active. When PCRF 110 determines that the said user has exceeded his allowed quota, it sends a credit control answer (CCA) message 204 to instruct PGW 112 to redirect the user to a portal so that the user can purchase more quota. Briefly, a CCA message includes information about the redirection URL, which can be the address of the portal that the user would be redirected to in order to purchase additional quota. In some embodiments, a portal includes an application that allows a user to link to sites that are free-rated, such as a redirect site or a payment site. In some embodiments, the redirect site is the first webpage that the user is redirected to. From there, the user can follow links and access other secondary sites as well.

FIG. 2B is a diagram showing sending and receiving of messages between PGW, PCRF and backend billing system when a usage threshold is reached, according to some embodiments of the present disclosure. FIG. 2B shows SGW 108, PGW 112, PCRF 110, BS 114, session setup status 210, message sent from PGW to PCRF 212, message sent from BS to PCRF 214, and message sent from PCRF to PGW 216.

Session setup status 210 indicates that UE has successfully attached to the network. After initial network attachment, BS 114 can determine when a user has exceeded an allotted quota. In some embodiments, BS 114 is part of an operations support system and it is provisioned with the allocated quota information for each user. BS 114 dynamically keeps track of the usage of this quota for each individual user and when a user exceeds the provisioned quota, it instructs the PCRF 110 to redirect the user. In some embodiments, the allotted quota is associated with a user depleting all credit associated with a mobile network usage account. In some embodiments, the allotted quota is associated with using a portion of the credit in a mobile network usage account (e.g., 10% or less credit remaining). When the backend billing system 114 determines that the said user has exceeded the allowed quota, BS 114 can communicate this information 214 to PCRF 110. Based on this information 214, PCRF 100 detects that a credit associated with a user mobile network usage account decreases below a threshold, which PCRF 100 in turn can send a re-authorize request (RAR) message 216 to the PGW 112 to instruct it to redirect the user to a portal so that the user can purchase more quota. PGW 112 sends a re-authorize answer (RAA) 212 in response to the RAR.

Figure 3:
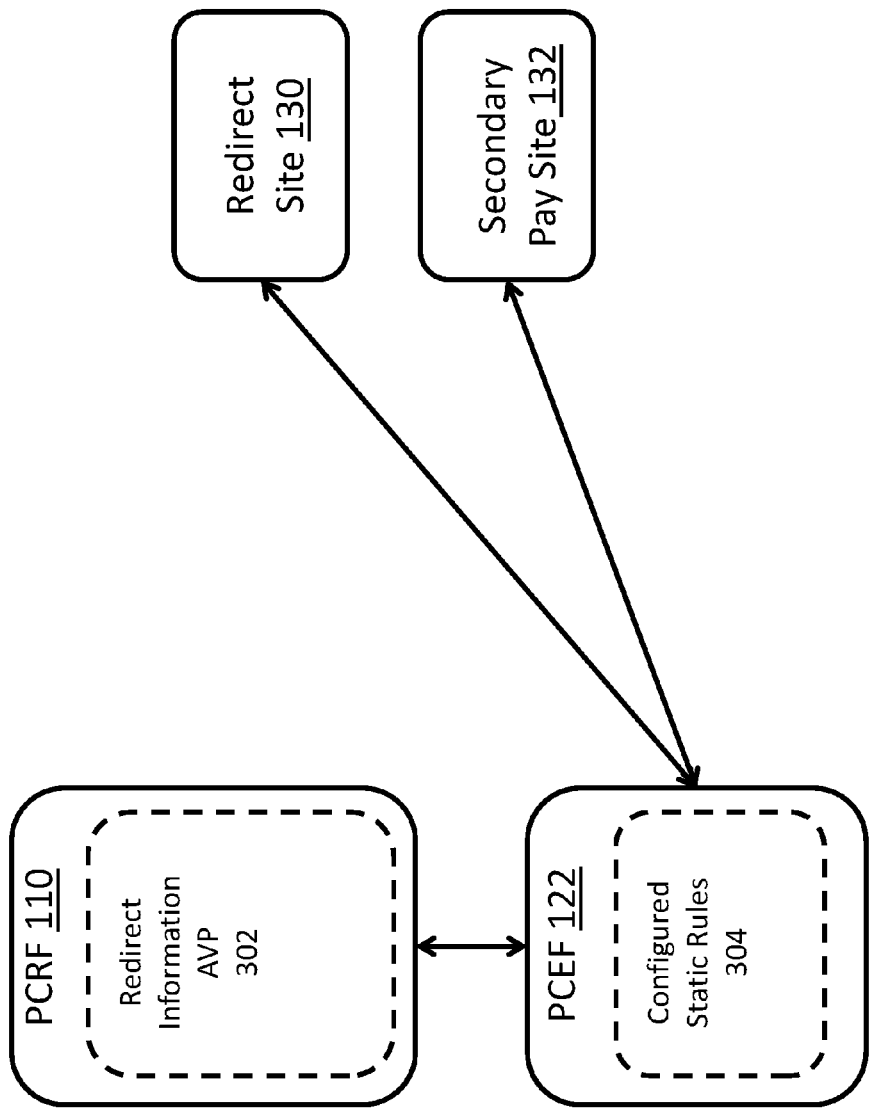
FIG. 3 is a system diagram showing routing of a user to a redirect site and a secondary pay site using AVP and PCEF.

FIG. 3 is a system diagram showing a traditional redirection of application traffic to a redirect URL and a secondary pay site. FIG. 3 shows PCRF 110, redirect information AVP 302, PCEF 122, redirect site 130 and secondary pay site 132.

PCRF 110 provides redirection information to PCEF 122 by sending redirect information AVP 302 over a DIAMETER based Gx interface. Redirect information AVP includes the following information:

```
Redirect-Information ::= < AVP Header: 1085 >
    [ Redirect-Support ]
    [ Redirect-Address-Type ]
    [ Redirect-Server-Address ]
    *[ AVP ]
```

Redirect information AVP 302 is a grouped AVP that communicates the following information:
1) Redirect-Support AVP (also referred to herein as redirection enablement status)—This attribute conveys whether redirection is enabled or disabled.
2) Redirect-Address-Type AVP—This attribute conveys whether the specified redirect server address is an IPv4 address or an IPv6 address or an URL.
3) Redirect-Server-Address AVP—This attribute conveys the address of the redirect server.

Redirect information AVP 302 only identifies the IP address or the URL of the redirect server 130. Any other URLs or IP addresses that the user needs to visit in order to purchase additional quota 132 is currently not communicated in redirect site AVP 302. In order to allow the user to visit secondary sites 132, an operator typically configures some static rules 304 on the PCEF 122 in order to free rate the traffic that is destined to (or originating from) these secondary sites. This forces the operator to always manage and maintain this static configuration on the PCEF 122. This can become cumbersome as the operator would have to configure these static rules on each PCEF whenever the operator signs up contracts with other resellers (as each of the resellers would have their own redirect URLs and secondary sites).

Figure 4:
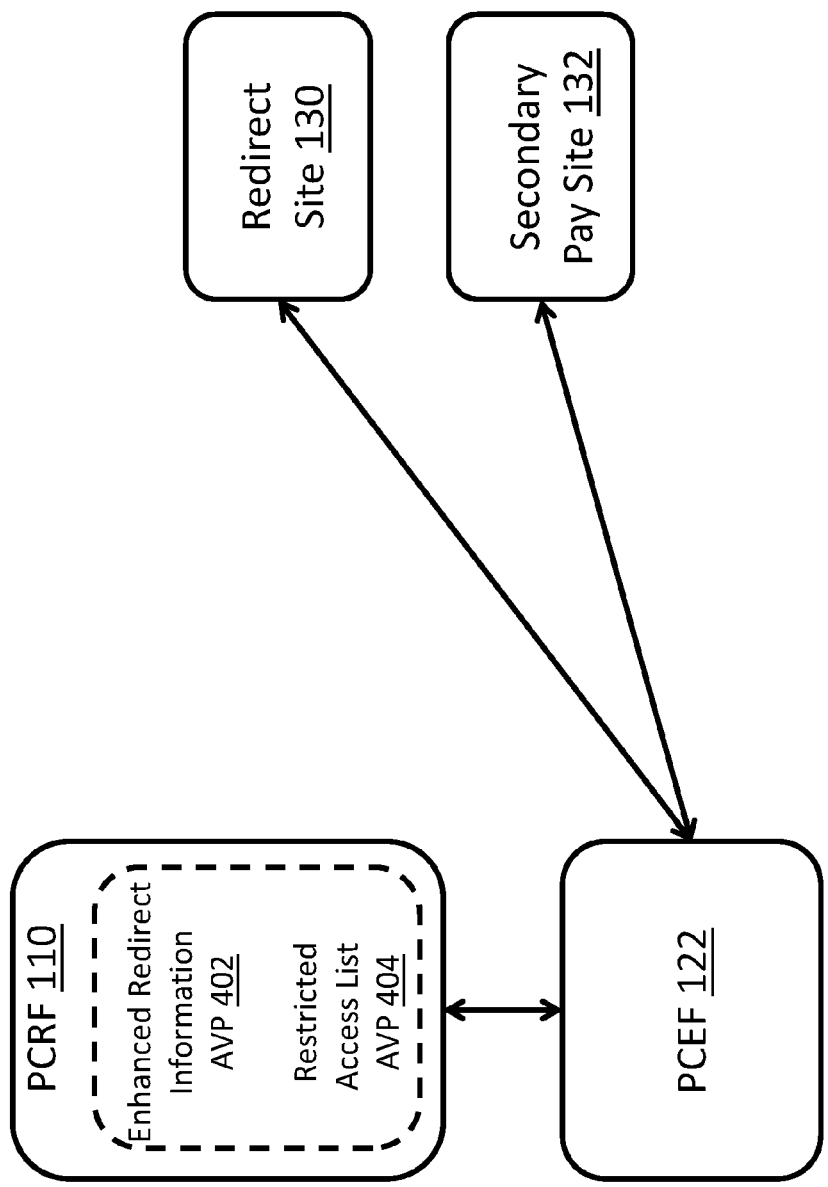
FIG. 4 is a system diagram showing routing of a user to a redirect site and a secondary pay site using AVP, according to some embodiments of the present disclosure.

FIG. 4 is a system diagram showing redirection of application traffic to a redirect URL and a secondary pay site using AVP, according to some embodiments of the present disclosure. FIG. 4 shows enhanced redirect information AVP 402, restricted access list AVP 404, PCEF 122, redirect site 130 and secondary pay site 132.

PCRF 110 provides enhanced redirect information AVP 402 and restricted access list AVP 404 to PCEF 122. The combination of enhanced redirect information AVP 402 and restricted access list AVP 404 allows PCRF 110 to communicate both redirect server information and secondary site information to PCEF 122 over the DIAMETER based Gx interface. Enhanced redirect information AVP 402 and restricted access list AVP 404 (also referred to herein as a tag to the user request) are shown below:

```
Redirect-Information ::= < AVP Header: 1085 >
    [ Redirect-Support ]
    [ Redirect-Address-Type ]
    [ Redirect-Server-Address ]
    [ Restricted-Access-List]
    *[ AVP ]
```

```
Restricted-Access-List ::= <AVP Header:: xxx>
    [Restriction-Filter-Rule]
        *[Restriction-Filter-Id]
    *[Redirect-Server]
```

Enhanced redirect information AVP 402 communicates Redirect-Support, Redirect-Address-Type, and Redirect-Server-Address, similar to information communicated in redirect information AVP 302. Enhanced redirect information AVP 402 also includes Restricted-Access-List. The Restricted-Access-List AVP is a grouped AVP that constitutes of the following AVPs:
1) Restriction-Filter-Rule AVP—This attribute allows the PCRF to provide filter rules that match secondary sites so that the user can successfully refill quota without the matching traffic getting blocked. In some embodiments, all users who have purchased service from the same reseller would use the same set of restriction filter rules.
2) Restriction-Filter-Id AVP—This attribute allows the PCRF to communicate the id of a filter rule that is preconfigured on the PCEF. In some embodiments, an operator can provision a list of rules that cover all redirect sites and secondary sites on the PCEF and keep them in disabled state. At a later point in time, the PCRF can then enable these static rules on a per session basis.
3) Redirect-Server AVP—This grouped attribute allows the PCEF to specify either the IP address or the URL of a secondary site.

Including a restricted access list AVP allows an operator to configure the redirect server as well as the secondary site information only on the PCRF network element. PCRF can then dynamically communicate this information to all the PCEF elements in the network via the DIAMETER protocol on the Gx interface. This alleviates the need for the operator to configure the secondary site information on the PCEF. This reduces the configuration burden on the operator. For example, in a typical wireless network, there are generally a lot more PCEF network elements than PCRF elements. PCRF is a central policy decision point. By provisioning the portal and secondary site information in PCRF, PCRF can dynamically provide this information to all the PCEF network elements that it communicates with. When an operator introduces new PCEF elements into their network, they do not have to worry about provisioning this information in each PCEF element that is introduced in the network.

Figure 5:
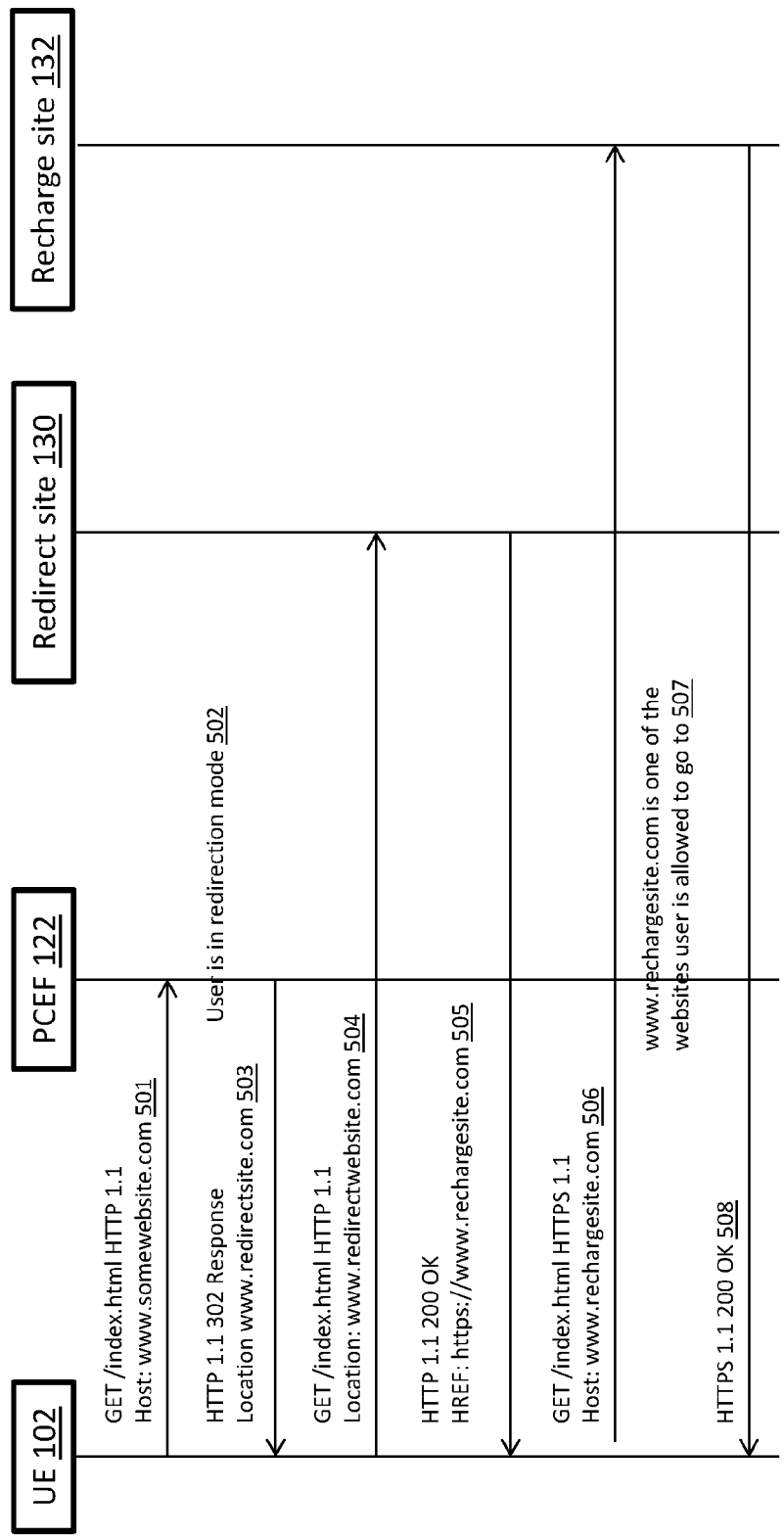
FIG. 5 is a diagram illustrating routing of a user to a redirect site and a secondary pay site, according to some embodiments of the present disclosure.

FIG. 5 is a diagram illustrating routing of a user to a redirect site and a secondary pay site, according to some embodiments of the present disclosure.

In step 501, UE 102 is attempting to go to a website http://www.somewebsite.com. In step 502, when PCEF 122 receives this packet, it recognizes that UE 102 was set to be in redirect mode by the PCRF network element. As a result, in step 503, PCEF 122 responds to this HTTP request with a 302 response code along with www.redirectsite.com as the Location. In step 504, when the web browser on UE 102 receives this message, it makes a second GET request to the website specified in the Location field, which in this example is www.redirectsite.com. In step 505, when the redirect site 130 receives this request, it responds with a 200 OK response and sends the top level webpage that also contains a HREF (HTTP Reference) to a recharge website 132 that the user needs to visit in order to fill up the quota. In step 506, user clicks this link to get to the URL www.rechargesite.com. In step 507, when PCEF 122 receives this request, it sees that the website that UE 102 is attempting to go to, which is www.rechargesite.com, is specified as one of the restriction filter rules by the PCRF, meaning that www.recharsite.com is an authorized site. PCEF 122 therefore allows the traffic to go to the recharge website 132. In step 508, when the recharge website receives the HTTPS request, it sends a 200 OK response and serves the top level webpage for this web site.

FIG. 6 is a flowchart illustrating the routing of a user, by a PCRF, to a redirect site and a secondary pay site, according to some embodiments of the present disclosure.

In step 601, PCRF receives a communication involving a request from a mobile device corresponding to a user. PCEF sends this communication to PCRF when it detects that UE has reached the usage threshold that was set for this UE by the PCRF when UE attaches to the network.

In step 602, PCRF detects that UE has reached the configured quota. Depending on the type of the plan a subscriber has signed up for, operator configures a maximum usage quota for each subscriber. This information is provisioned in the back end billing system. When a user is in the process of initial attachment to the network, the PCRF communicates with the billing system to get the quota information for the subscriber. PCRF uses this information to determine if the quota usage of a UE has reached the configured value. Once UE reaches the configured quota, UE is required to purchase additional quota before UE can successfully use the network for user traffic. As described above, UE can use the network for free-rated traffic associated with reaching a secondary site.

In step 603, PCRF sets UE in redirect mode and assigns UE a redirect site and secondary site information. As described above, redirect site and secondary site can be specified in an enhanced redirect information AVP 402 and a restricted access list AVP 404.

In step 604, PCRF communicates this information back to the PCEF in a CCA message. Upon receipt of this message, PCEF redirects any HTTP requests that originate from the UE to the portal communicated by the PCRF in step 604. After visiting the portal, the user can follow a link on the portal and access a redirect site or a secondary site. User can then purchase additional quota in order to continue using the network.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are illustrative, and that it is contemplated that there are other systems and methods that are within the scope of the disclosed subject matter.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing illustrative embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A method of directing a mobile device user with insufficient mobile credit to secondary pay sites, the method comprising:
   receiving, by a Policy Control and Charging Rules Function (PCRF), a request from a mobile device corresponding to a user, the request including a URL;
   detecting, by the PCRF, a credit associated with a user mobile network usage account is below a threshold;
   assigning, by the PCRF, a tag to the request, the tag including redirect site information and secondary site information, the redirect site information including at least one network identifier corresponding to a redirect site and the secondary site information including at least one network identifier corresponding to a payment site accessible by the user when the credit associated with the user mobile network usage account is below the threshold; and
   transmitting, by the PCRF, the request and the corresponding tag to a Policy and Charging Enforcement Function (PCEF) for routing the user to the at least one of the redirect site and the at least one payment site.

2. The method of claim 1, wherein the tag further includes at least one of a restriction filter rule, the restriction filter rule associated with at least one payment site such that traffic associated with the payment site is not blocked.

3. The method of claim 2, wherein the restriction filter rule is associated with a restriction filter ID, the restriction filter ID associated with a restriction filter rule preconfigured on the PCEF.

4. The method of claim 1, wherein the request further includes a credit control request update (CCR-U) message, the CCR-U message including usage information associated with the user.

5. The method of claim 4, wherein the CCR-U message further includes at least one of: information about a subscription ID, the subscription ID identifying the user; and
   information about a used service ID, the used service ID indicating an amount of quota used since a service associated with the user became active.

6. The method of claim 1, wherein the PCEF is co-located with a packet data network gateway (PGW).

7. The method of claim 1, wherein the tag comprises at least one attribute-value pair (AVP).

8. The method of claim 1, wherein the tag further includes at least one of:
   a redirection enablement status; and
   a redirect address type, the redirect address type associated with at least one of an IPv4 address, IPv6 address or a URL.

9. The method of claim 1, wherein the network identifier comprises at least one of an IP address and a URL.

10. The method of claim 1, wherein the threshold is associated with the user having 10% or less credit remaining in the user mobile network usage account.

11. A system for directing a mobile device user with insufficient mobile credit to secondary pay sites, the system comprising:
    a processor; and
    memory coupled to the processor and including computer-readable instructions that, when executed by a processor, cause the processor to:
      receive, by a Policy Control and Charging Rules Function (PCRF), a request from a mobile device corresponding to a user, the request including a URL;
      detect, by the Policy Control and Charging Rules Function (PCRF), a credit associated with a user mobile network usage account is below a threshold;
      assign, by the Policy Control and Charging Rules Function (PCRF), a tag to the request, the tag including redirect site information and secondary site information, the redirect site information including at least one network identifier corresponding to a redirect site and the secondary site information including at least one network identifier corresponding to a payment site accessible by the user when the credit associated with the user mobile network usage account is below the threshold; and
      transmit, by the Policy Control and Charging Rules Function (PCRF), the request and the corresponding tag to a Policy and Charging Enforcement Function (PCEF) for routing the user to the at least one of the redirect site and the at least one payment site.

12. The system of claim 11, wherein the tag further includes at least one of a restriction filter rule, the restriction filter rule associated with at least one payment site such that traffic associated with the payment site is not blocked.

13. The system of claim 12, wherein the restriction filter rule is associated with a restriction filter ID, the restriction filter ID associated with a restriction filter rule preconfigured on the PCEF.

14. The system of claim 11, wherein the request further includes a credit control request update (CCR-U) message, the CCR-U message including usage information associated with the user.

15. The system of claim 14, wherein the CCR-U message further includes at least one of: information about a subscription ID, the subscription ID identifying the user; and
    information about a used service ID, the used service ID indicating an amount of quota used since a service associated with the user became active.

16. The system of claim 11, wherein the PCEF is co-located with a packet data network gateway (PGW).

17. The system of claim 11, wherein the tag comprises at least one attribute-value pair (AVP).

18. The system of claim 11, wherein the tag further includes at least one of:
   a redirection enablement status; and
   a redirect address type, the redirect address type associated with at least one of an IPv4 address, IPv6 address or a URL.

19. The system of claim 11, wherein the network identifier comprises at least one of an IP address and a URL.

20. The system of claim 11, wherein the threshold is associated with the user having 10% or less credit remaining in the user mobile network usage account.

* * * * *